US012673859B2

(12) United States Patent
Servais et al.

(10) Patent No.: US 12,673,859 B2
(45) Date of Patent: Jul. 7, 2026

(54) MATERIAL HANDLER FOR AERIAL PLATFORMS

(71) Applicant: Altec Industries, Inc., Birmingham, AL (US)

(72) Inventors: Aaron Servais, Gower, MO (US); Austin Graham, Kansas City, MO (US)

(73) Assignee: Altec Industries, Inc., Birmingham, AL (US)

( * ) Notice: Subject to any disclaimer, the term of this patent is extended or adjusted under 35 U.S.C. 154(b) by 387 days.

(21) Appl. No.: 18/369,677

(22) Filed: Sep. 18, 2023

(65) Prior Publication Data

US 2025/0091851 A1 Mar. 20, 2025

(51) Int. Cl.
*B66F 13/00* (2006.01)
*B66F 11/04* (2006.01)

(52) U.S. Cl.
CPC ............ *B66F 13/00* (2013.01); *B66F 11/044* (2013.01)

(58) Field of Classification Search
CPC ...... B66F 17/006; B66F 11/044; B66F 13/00; A62B 35/0081; A62B 35/0068; A62B 35/0037
USPC .................................................... 182/2.4, 222
See application file for complete search history.

(56) References Cited

U.S. PATENT DOCUMENTS

| | | | | |
|---|---|---|---|---|
| 3,295,633 A * | 1/1967 | Milner, Jr. | B66F 11/044 | 182/2.4 |
| 4,334,594 A * | 6/1982 | Jost | B66F 11/044 | 182/2.1 |
| 4,763,755 A * | 8/1988 | Murray | B66F 11/044 | 182/2.2 |
| 5,944,138 A * | 8/1999 | Vollmer | B66F 11/044 | 182/2.1 |
| 6,265,983 B1 * | 7/2001 | Baillargeon | B66F 11/044 | 340/687 |
| 9,149,670 B1 * | 10/2015 | Walker | A62B 35/0043 | |
| 9,221,660 B2 * | 12/2015 | Chard | B66F 11/04 | |
| 9,245,434 B2 * | 1/2016 | Baillargeon | G08B 25/10 | |
| 9,492,693 B2 * | 11/2016 | Byrd | A62B 35/0068 | |
| 9,776,845 B2 * | 10/2017 | Minke | B66F 11/04 | |
| 9,851,048 B2 * | 12/2017 | Higgins | F16M 13/02 | |
| 10,549,974 B2 | 2/2020 | McKinney et al. | | |

(Continued)

OTHER PUBLICATIONS

Ryan J. Mckinney, et al, US Patent Application "Mounting System for Elevating Platform" U.S. Appl. No. 18/224,918, filed Jul. 21, 2023.

(Continued)

*Primary Examiner* — Eret C McNichols
(74) *Attorney, Agent, or Firm* — Erise IP, P.A.

(57) ABSTRACT

A material handler for supporting loads by an aerial platform of an aerial device is disclosed. Embodiments of the current disclosure relate to a material handler comprising L-brackets, T-braces, and cross members. The L-brackets and T-braces may be configured to intersect and attach to a sidewall of the aerial platform. Furthermore, the L-brackets and T-braces may be configured with an opening providing a space for receiving the crossmember therewithin. Furthermore, the components of the material handler may comprise composite and dielectric material for supporting the load and providing electrical insulation for the aerial platform in an electrified working environment.

19 Claims, 8 Drawing Sheets

(56) References Cited

U.S. PATENT DOCUMENTS

| | | | | |
|---|---|---|---|---|
| 10,669,142 | B2 | 6/2020 | McKinney et al. | |
| 10,815,106 | B2 | 10/2020 | McKinney et al. | |
| 10,822,216 | B2 | 11/2020 | McKinney et al. | |
| 10,823,327 | B2 | 11/2020 | McKinney et al. | |
| 10,968,090 | B2 | 4/2021 | McKinney et al. | |
| 11,104,563 | B1 * | 8/2021 | Deters | B66F 11/04 |
| 11,130,663 | B2 * | 9/2021 | Linsmeier | E06C 7/16 |
| 11,192,765 | B1 * | 12/2021 | Featherstone | B66F 17/006 |
| 11,306,867 | B2 | 4/2022 | McKinney et al. | |
| 11,725,776 | B2 | 8/2023 | McKinney et al. | |
| 12,172,874 | B2 * | 12/2024 | McKinney | B66F 11/044 |
| 12,187,588 | B2 * | 1/2025 | McKinney | B66F 11/044 |
| 12,429,162 | B2 * | 9/2025 | McKinney | H01B 17/24 |
| 2016/0023023 | A1 * | 1/2016 | Byrd | B66F 17/006 182/3 |
| 2016/0368738 | A1 * | 12/2016 | Minke | B66F 11/04 |
| 2017/0369296 | A1 * | 12/2017 | McKinney | B66F 11/044 |
| 2018/0362313 | A1 * | 12/2018 | Bonnefoy | B66F 17/006 |
| 2020/0346909 | A1 | 11/2020 | McKinney et al. | |
| 2021/0039932 | A1 | 2/2021 | McKinney et al. | |
| 2021/0039933 | A1 | 2/2021 | McKinney et al. | |
| 2021/0214204 | A1 | 7/2021 | McKinney et al. | |

OTHER PUBLICATIONS

Ryan J. Mckinney, et al, US Patent Application “Mounting System for Elevating Platform” U.S. Appl. No. 18/233,034, filed Aug. 11, 2023.

* cited by examiner

MATERIAL HANDLER FOR AERIAL PLATFORMS

BACKGROUND

1. Field

Embodiments of the present disclosure relate to a material handler. Specifically, embodiments of the present disclosure relate to a material handler attached to an aerial platform and configured for work in an electrified environment.

2. Related Art

Aerial devices for working on energized power lines generally comprise a lower, electrically non-insulating boom section, and an upper, insulating boom section such that a dielectric gap is created to enable linemen to work on the energized power lines. Typically, aerial devices include an aerial platform at a boom tip of the boom for a lineman to stand in while the lineman works on the elevated power lines. Periodically, the lineman may need tools or equipment that can be attached to the aerial platform and raised by the boom. However, aerial platforms typically do not have built-in material handling devices. Generally, the lineman may hold equipment, or the lineman may tie a first end of a rope, tether, or cable to the equipment and hook a second end of the tether to the aerial platform to raise the equipment. The attachment to the aerial platform typically comprises hooks that are not reinforced and have relatively low load limits or the tether is attached to a portion of the aerial platform that is not designed for tethering loads. Furthermore, attachment methods generally comprise carabiners, hooks, or some other metallic fastener. These fasteners are generally non-dielectric and may conduct electrical energy. As such, what is needed is a material handler that is reinforced, composite, non-conductive, and able to support necessary loads for performing aerial work in an electrified environment.

SUMMARY

Embodiments of the present disclosure solve the above-mentioned problems by providing reinforced material handling assemblies disposed on an sidewalls of an aerial platform. The material handing assemblies provide reinforced support for loads by attaching brackets to the sidewalls of the aerial platform. Furthermore, the loads applied to the material handling assemblies may be spread over several attachment areas such that greater loads may be applied. Further still, some or all parts of the material handler assemblies may be composite such that all materials are dielectric, reducing, or eliminating, the potential for electric discharge from proximate high voltage power lines.

In some aspects, the techniques described herein relate to a first embodiment of a material handler for supporting a load on an aerial platform, the material handler including a T-brace including a strut configured to be inserted through a sidewall of the aerial platform spanning between an interior of the aerial platform and an exterior of the aerial platform, and a plate configured to be in contact with an interior side of the sidewall of the aerial platform; an L-bracket configured to be placed in contact with the strut and an exterior side of the sidewall of the aerial platform; and an opening formed in the L-bracket and the strut of the T-brace providing a space for receiving the load, wherein the L-bracket and the T-brace are configured to support the load in the opening providing at least a portion of the load to a portion of the sidewall of the aerial platform in contact with the plate.

In some aspects, the techniques described herein relate to the material handler, wherein the L-bracket is coupled to the strut and the exterior side of the sidewall by an adhesive, and wherein the plate is coupled to the interior side of the sidewall by the adhesive.

In some aspects, the techniques described herein relate to the material handler, further including a composite dielectric material supporting the load and insulating the aerial platform from electric energy.

In some aspects, the techniques described herein relate to the material handler, wherein the composite dielectric material is a fiber-reinforced material.

In some aspects, the techniques described herein relate to the material handler, wherein the opening forms one of a circle or a hook.

In some aspects, the techniques described herein relate to the material handler, wherein the T-brace is a first T-brace, wherein the L-bracket is a first L-bracket, wherein the opening is a first opening, and wherein the material handler further includes a second T-brace disposed on the sidewall of the aerial platform, a second L-bracket disposed on the sidewall of the aerial platform, wherein the second T-brace and the second L-bracket in combination providing a second opening, and a crossmember disposed in the first opening and the second opening and configured to support the load between the first T-brace, the first L-bracket, and the second T-brace, and the second L-bracket.

In some aspects, the techniques described herein relate to the material handler, wherein the first opening and the second opening are circular and the crossmember is cylindrical, and wherein the material handler further includes crossmember fasteners securing the crossmember in the first opening and the second opening.

In some aspects, the techniques described herein relate to a second embodiment of a material handler for supporting a load on an aerial platform, the material handler including a T-brace including: a strut configured to be inserted through a sidewall of the aerial platform spanning between an interior of the aerial platform and an exterior of the aerial platform, and a plate configured to be in contact with an interior side of the sidewall of the aerial platform; an L-bracket configured to be placed in contact with the strut and an exterior side of the sidewall of the aerial platform; and an opening formed in the L-bracket and the strut of the T-brace, and a crossmember configured to be disposed in the opening and support the load.

In some aspects, the techniques described herein relate to the material handler, wherein the T-brace and the L-bracket include dielectric material configured to support the load and insulate the aerial platform from electric energy.

In some aspects, the techniques described herein relate to the material handler, wherein the T-brace and the L-bracket are connected by an adhesive.

In some aspects, the techniques described herein relate to the material handler, wherein the T-brace is coupled to the interior side of the sidewall by the adhesive and the L-bracket is coupled to the exterior side of the sidewall by the adhesive.

In some aspects, the techniques described herein relate to the material handler, wherein the opening includes a circle, and wherein the crossmember is cylindrical and configured to be disposed within the opening.

In some aspects, the techniques described herein relate to the material handler, further including a plurality of L-brackets and a plurality of T-braces providing a plurality of openings, wherein the plurality of L-brackets and the plurality of T-braces are coupled to the sidewall and are configured to receive and support the crossmember in the plurality of openings.

In some aspects, the techniques described herein relate to the material handler, wherein the crossmember is secured by crossmember fasteners at each end of the crossmember.

In some aspects, the techniques described herein relate to a third embodiment of a material handler for supporting a load on an aerial platform, the material handler including a plurality of T-braces, each T-brace including: a strut configured to be inserted through a sidewall of the aerial platform from an interior of the aerial platform to an exterior of the aerial platform, and a plate configured to be in contact with an interior side of the sidewall of the aerial platform, a plurality of L-brackets, each L-bracket of the plurality of L-brackets configured to be placed in contact with a corresponding strut and an exterior side of the sidewall of the aerial platform, and an opening formed in each L-bracket and each corresponding strut of the plurality of T-braces, and a crossmember configured to be disposed in the opening of each T-brace and each L-bracket and configured to support the load.

In some aspects, the techniques described herein relate to the material handler, wherein the plurality of T-braces, the plurality of L-brackets, and the crossmember include dielectric materials configured to insulate the aerial platform from electric energy.

In some aspects, the techniques described herein relate to the material handler, wherein the plurality of T-braces, the plurality of L-brackets, and the crossmember include composite material configured to support the load.

In some aspects, the techniques described herein relate to the material handler, wherein the crossmember is a cylinder, and the opening is a circle.

In some aspects, the techniques described herein relate to the material handler, wherein the plurality of L-brackets is coupled to the exterior side of the sidewall, and the plurality of T-braces is coupled to the interior side of the sidewall.

In some aspects, the techniques described herein relate to the material handler, wherein the plurality of L-brackets and the plurality of T-braces are coupled to the sidewall by an adhesive.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1A:
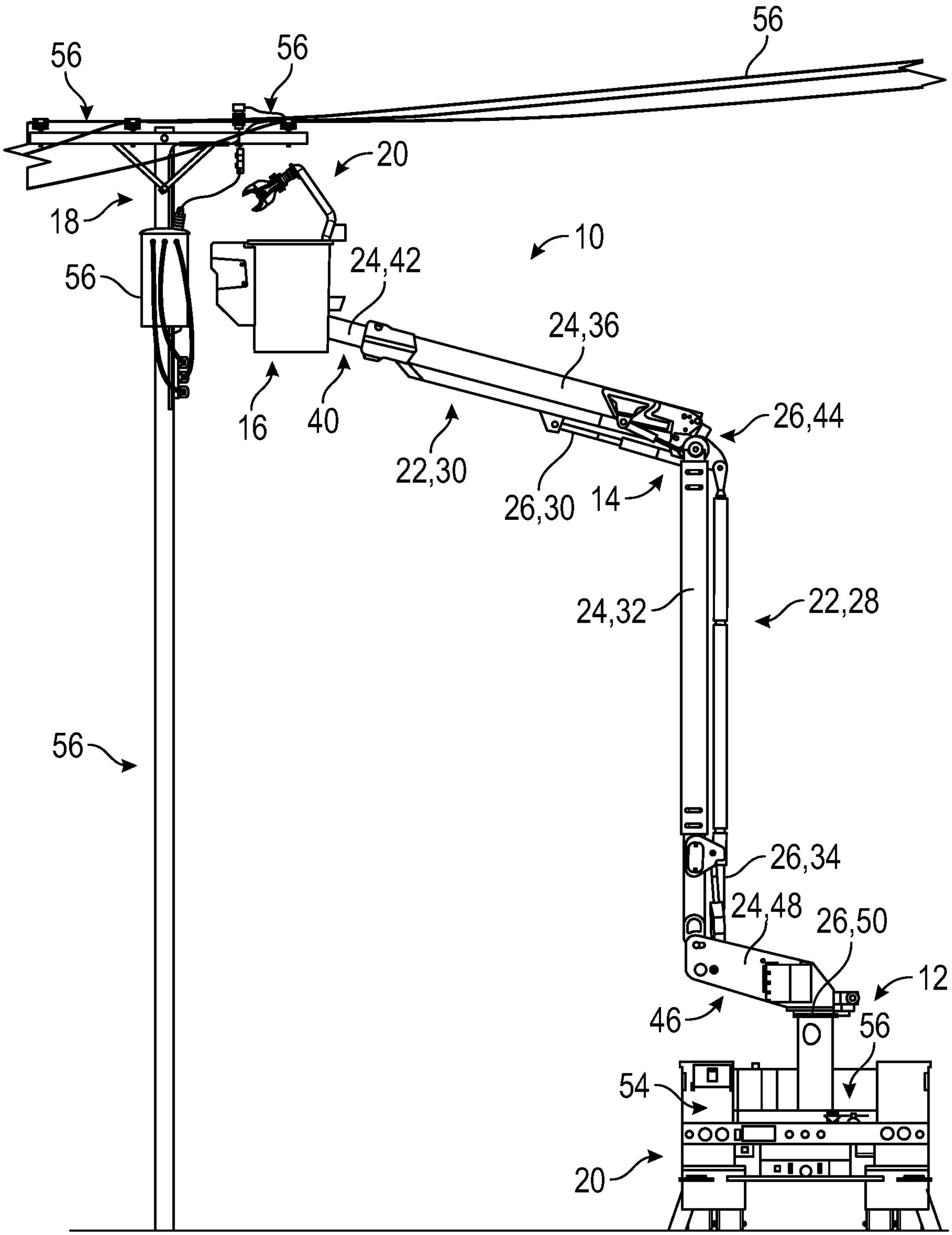
FIGS. 1A-1B illustrate an aerial device comprising an aerial platform for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to an electrically insulating material handler provided on an aerial platform. In some embodiments, the material handler may be attached to the aerial platform for performing work in an aerial electrically charged working environment. The material handler may comprise an assembly of components that, when assembled, receive, and support a load on a sidewall of the aerial device. The material handler may be attached to the sidewall mechanically by sliding a bracket through a slit in the sidewall and by adhesive connecting a T-brace on an interior of the sidewall and an L-bracket on an exterior of the sidewall. As such, any load applied to the material handler may be transferred to the sidewall of the aerial platform through the surface area in contact.

In some embodiments, the material handler may comprise shapes, or attachment locations, formed into the T-brace and the L-bracket for receiving loads. In some embodiments, a leveling rod, or crossmember, may be disposed within a space provided by the formed shapes for receiving the crossmember. Any equipment that needs to be raised to the working environment may be attached to the crossmember and lifted by the boom of the aerial device. In some embodiments, the attachment location of the material handler may be a hook formed from the T-brace and the L-bracket, and the equipment may be attached to the hook for raising to the working environment.

Furthermore, in some embodiments, the material handler may comprise a dielectric material. The dielectric material may provide another layer to the insulating features of the aerial platform. The dielectric material may also be composite material configured to withstand the loads necessary to raise the necessary equipment to the working environment.

Figure 1B:
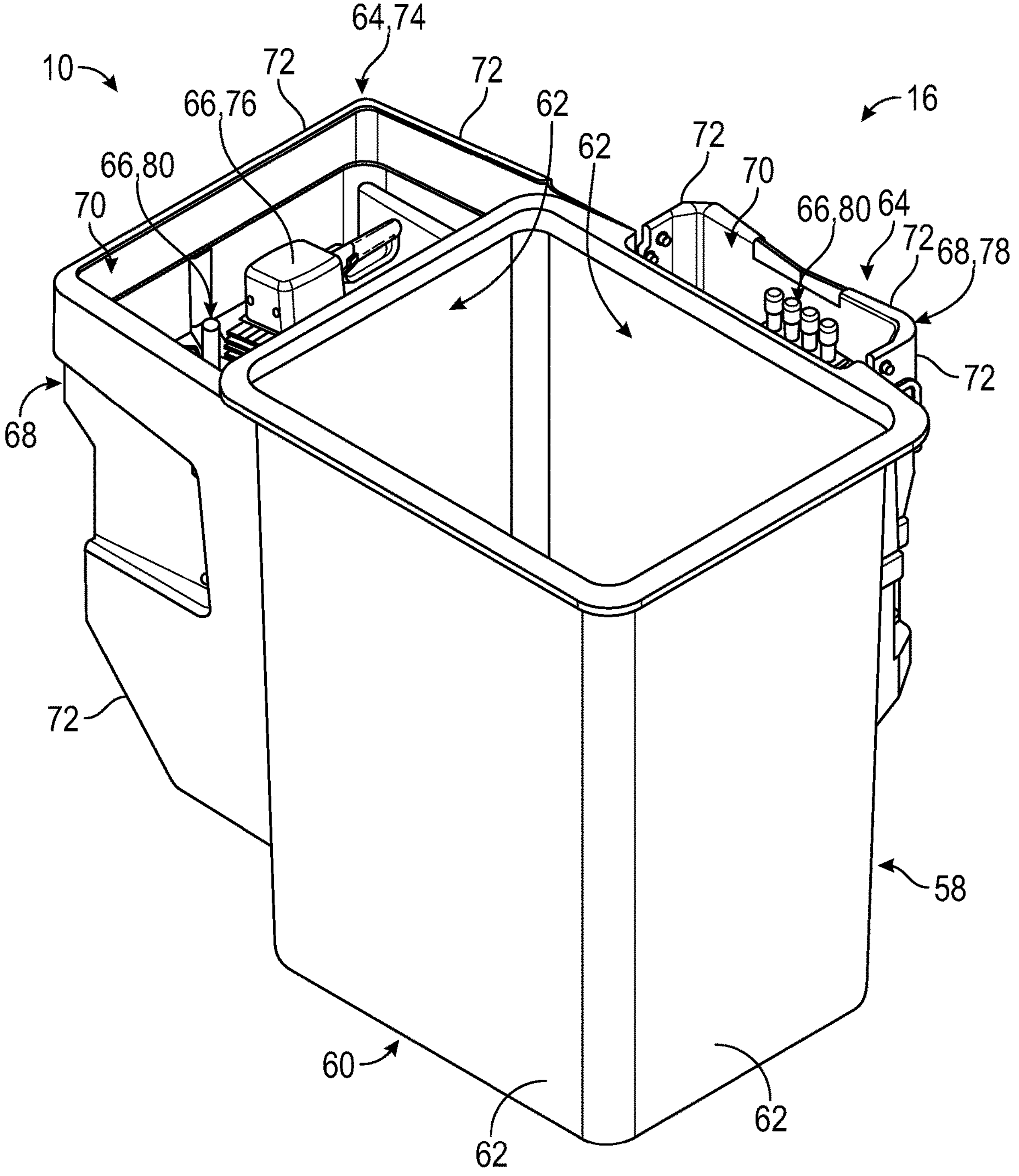

Referring now to FIGS. 1A and 1B, the presently disclosed subject matter is further described. As shown in FIG. 1A, aerial device 10 may include base 12, boom assembly 14, and aerial platform 16. Boom assembly 14 may be rotatably and/or pivotably coupled to base 12. Aerial platform 16 may be coupled to boom assembly 14. Aerial platform 16 may provide a platform for performing a task at worksite 18, such as a task performed at least in part by a utility worker, including, for example, a task performed using one or more auxiliary systems 20, such as a robot, a hoist, a tool, a machine, or the like.

Base 12 of aerial device 10 may provide a stabilized platform that supports boom assembly 14 in a variety of positions, for example, with aerial platform 16 situated in proximity to worksite 18. Base 12 may provide stability, such as a counterweight, to boom assembly 14 and/or to a load supported by boom assembly 14. In some embodiments, base 12 may include or may be embodied as a ground-based structure, a floating structure, or an airborne structure. By way of example, base 12 may include or may be embodied as utility truck, a crane base, an earth-working machine, a barge, a marine vessel, an oil rig, a sky crane, or a helicopter.

Boom assembly 14 may include one or more boom sections 22. One or more boom sections 22 may respectively include boom member 24, such as a beam, an arm, a spar, a truss, or the like. One or more boom sections 22 may respectively include one or more aerial lift actuators 26, such as a hydraulic actuator and/or the like. One or more aerial lift actuators 26 may be operable to move a corresponding boom member 24. Boom member 24 may be moved to a desired position by actuating corresponding aerial lift actuator 26. One or more boom sections 22 may be moved according to any one or more modalities, such as pivoting, telescoping, rotating, and so forth. By way of example, as shown in FIG. 1A, boom assembly 14 may include lower boom section 28 and upper boom section 30. Lower boom section 28 and/or upper boom section 30 may move according to pivoting modality. Lower boom section 28 may include lower boom member 32 and lower boom actuator 34. Upper boom section 30 may include upper boom member 36, and upper boom actuator 38. Additionally, or in the alternative, boom assembly 14 may include telescoping-boom section 40 that moves according to a telescoping modality. Telescoping-boom section 40 may include telescoping-boom member 42 and telescoping-boom actuator 44. Telescoping-boom member 42 may be extended and/or retracted by actuating telescoping-boom actuator 44. In some embodiments, telescoping-boom section 40 may define at least a portion of a boom section that moves according to a pivoting modality, such as lower boom section 28 and/or upper boom section 30. Additionally, or in the alternative, boom assembly 14 may include a rotating-boom section 46 that moves according to a rotating modality. Rotating-boom section 46 may include rotating-boom member 48 and rotating-boom actuator 50.

Aerial device 10 may include a power source, such as an engine. The power source may be integrated into base 12. By way of example, the power source, may include a combustion engine, a hybrid-electric engine, or an electric engine of the vehicle. The power source may provide power to hydraulic system 54 configured to operate boom assembly 14.

As shown in FIG. 1A, boom assembly 14 may include rotating-boom section 46, lower boom section 28, upper boom section 30, and telescoping-boom section 40. Rotating-boom section 46 may be coupled to base 12 of aerial device 10. Lower boom section 28 may be coupled to rotating-boom section 46. Upper boom section 30 may be coupled to lower boom section 28. Telescoping-boom section 40 may be coupled to the upper boom section 30. Additionally, or in the alternative, telescoping-boom section 40 may define a portion of upper boom section 30. Aerial device 10 may include aerial platform 16 coupled to boom assembly 14, such as to a respective boom section 22 of boom assembly 14. For example, aerial platform 16 may be coupled to telescoping-boom section 40 and/or to upper boom section 30 of boom assembly 14. Boom assembly 14 may be operable to position aerial platform 16 in proximity to worksite 18, for example, by actuating one or more aerial lift actuator 26. By way of illustration, as shown in FIG. 1A, worksite 18 may include various components associated with a utility system, such as an electrical power system. Some of the various components associated with the utility system may define obstacles 56, such power poles, cross-arms, power lines, transformers, and so forth. One or more boom sections 22 of boom assembly 14 may be selectively actuated to position aerial platform 16 in proximity to worksite 18, for example, while navigating around such obstacles 56. In some embodiments, one or more of obstacles 56 may define a portion of worksite 18. For example, work may be performed upon one or more of obstacles 56.

Referring now to FIG. 1B, aerial platform 16 is further described. As shown in FIG. 1B, aerial platform 16 may include workstation 58. Workstation 58 may be configured as a bucket, a basket, or the like, within which an operator may be situated, for example, when performing work such as moving aerial platform 16 into proximity of worksite 18 and/or performing tasks associated with worksite 18. Workstation 58 may include platform floor 60, and one or more sidewalls 62. One or more sidewalls 62 may be configured to contain the operator within workstation 58, for example, with the operator standing on platform floor 60.

Aerial platform 16 may include one or more control consoles 64. One or more control consoles 64 may respectively define a portion of workstation 58 and/or one or more control consoles 64 may be disposed adjacent to the workstation 58. Additionally, or in the alternative, one or more control consoles 64 may be attached to workstation 58. For example, as shown in FIG. 1B, one or more consoles 64 may be attached to sidewall 62 of workstation 58.

As shown in FIG. 1B, a control console 64 may include one or more control input apparatuses 66. In some embodiments, as shown, control console 64 may include apron 68 that at least partially surrounds one or more control input apparatuses 66. An operator may reach into apron 68, such as through aperture 70 disposed about a top and/or side of control console 64, to operate one or more control input apparatuses 66. Apron 68 may include one or more apron-walls 72. One or more apron walls 72 may be coupled to sidewall 62 of workstation 58. Aperture 70 of the apron 68 may be defined at least in part by the one or more apron walls 72 and/or at least in part by sidewall 62 of workstation 58.

In some embodiments, as shown, for example, in FIG. 1B, aerial platform 16 may include primary control console 74. Primary control console 74 may include control input apparatus 66 configured to perform primary control operations associated with aerial device 10. Such that control input apparatus 66 may be configured to perform primary control operations and may be referred to as primary control input apparatus 76. For example, control input apparatus 66, such as primary control input apparatus 76, may be configured to perform one or more control operations associated with the boom assembly 14. In some embodiments, control input apparatus 66 may be configured to actuate one or more boom actuators 26, such as lower boom actuator 34, upper boom actuator 38, telescoping-boom actuator 44, and/or rotating boom actuator 50. Primary control input apparatus 76 may be actuated, for example, when doing work such as moving aerial platform 16 into proximity of worksite 18.

In some embodiments, as shown, for example, in FIG. 1B, aerial platform 16 may include auxiliary control console 78. Auxiliary control console 78 may include one or more control input apparatuses 66 configured to perform auxiliary control operations associated with aerial device 10 and/or one or more auxiliary systems 20. Additionally, or in the alternative, primary control console 74 may include one or more control input apparatuses 66 configured to perform auxiliary control operations associated with aerial device 10 and/or one or more auxiliary systems 20. Furthermore, control input apparatus 66 may be configured to perform auxiliary control operations and may be referred to as auxiliary control input apparatus 80. For example, control input apparatus 66, such as auxiliary control input apparatus 80, may be configured to operate one or more auxiliary systems 20, such as a robot, a hoist, a tool, a machine, or the like. One or more auxiliary systems 20 may be operated, at least in part by actuating one or more auxiliary control input apparatuses 80, in association with doing work such as performing tasks associated with worksite 18.

Figure 2A:
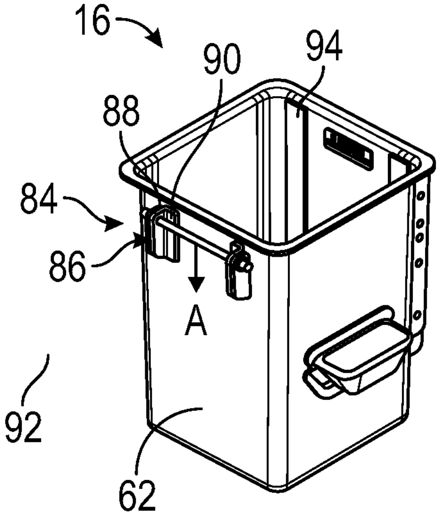
FIGS. 2A-2D illustrate embodiments of a material handler for use with the aerial platform of FIGS. 1A and 1B.

FIGS. 2A-2D depict material handler 84 illustrating various placement and load supporting positions on aerial platform 16. In some embodiments, material handler 84 comprises handler component assembly 86 comprising T-brace 88 and L-bracket 90. Furthermore, in some embodiments, material handler 84 may comprise crossmember 92. As shown in FIG. 2A a one-person bucket comprising an approximately square profile may include two handler component assemblies 86 supporting crossmember 92 disposed therebetween. As such, load A may be applied to crossmember 92 and component assemblies 86 may support load A by transferring load A from crossmember 92 to sidewall 62 of aerial platform 16. Load A may be transferred to aerial platform 16 based on the configuration of material handler 84. The configuration of material handler 84 and load transfer is described in more detail below.

Figure 2B:
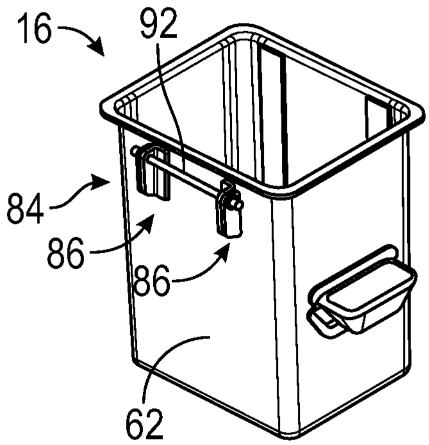

FIG. 2B depicts an exemplary second embodiment of aerial platform 16 comprising a rectangular profile providing more room to a single worker or, in some embodiments, space for a second worker or additional equipment and tools. Here, material handler 84 may comprise two sets of component assemblies 86. A distance between each component assembly 86 may be the same as in FIG. 2A or may be different based on the width of sidewall 62. As shown, crossmember 92 supports load A; however, based on the length and cross-sectional area of crossmember 92, a greater or less load may be supported. As such, different sidewall widths may support different lengths of crossmember 92 and similarly, distances between component assemblies 86.

Figure 2C:
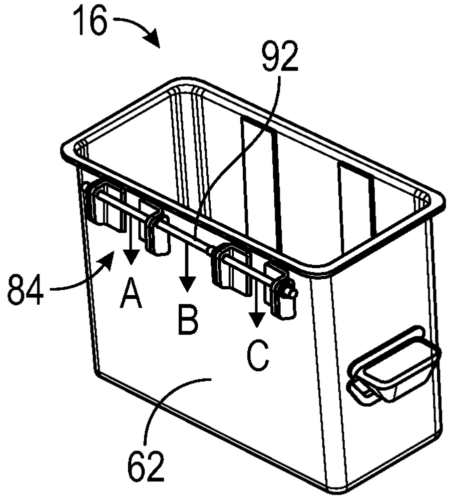

As shown in FIG. 2C a plurality of component assemblies 86 may be disposed on sidewall 62 of aerial platform 16. Here, a two-person platform is depicted along with material handler 84 comprising four component assemblies 86 and a single crossmember 92 spanning all component assemblies 86. Here, Loads A, B, and C are supported by material handler 84. In some embodiments, loads A, B, and C may be a single load (e.g., a single piece of equipment) that is split into thirds by attaching the single load at the 3 different locations. As such, the weight of the single piece of equipment is distributed across the three loads A, B, and C. In some embodiments loads A, B, and C may be separate and independent loads or any combination of two loads (e.g., A+B, C; A+C, B; A, B+C).

In some embodiments, crossmember 92 may be separate crossmembers with different lengths and different cross-sectional areas and shapes such that each separate cross-member may support different loads and may support different attachment mechanisms. For example, a first crossmember may span the distance between two handler component assemblies 86 supporting load A and a second crossmember may space the distance between two handler component assemblies 86 supporting load C. In some embodiments, only the first crossmember may be present and additional component assemblies may comprise hooks as fastening devices for supporting individual loads without crossmember 92. The various fastening configurations are described in detail below.

Figure 2D:
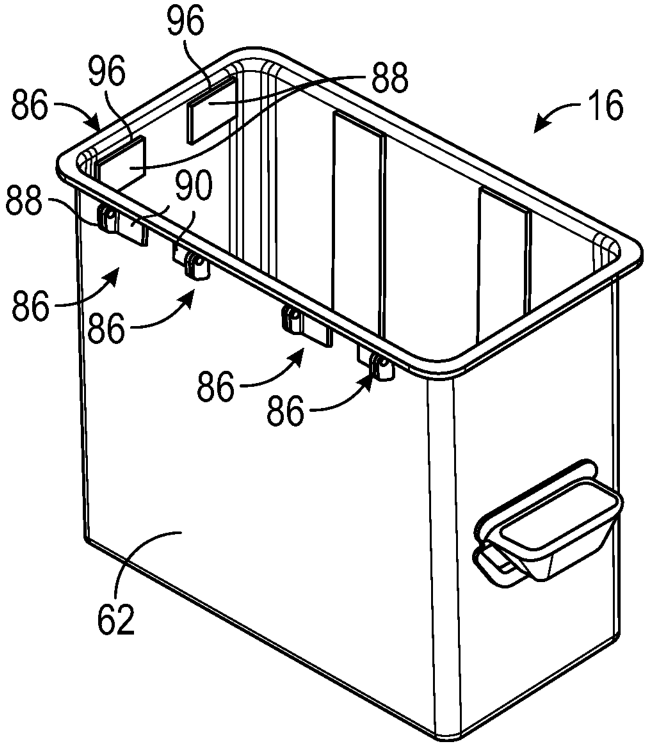

FIG. 2D depicts an embodiment of material handler 84 comprising four component assemblies 86. Here, handler component assemblies 86 comprise wider L-brackets 90 and T-braces 88 resulting in more surface area in contact with sidewall 62. More surface area allows the load to be distributed across a larger area of sidewall 62 potentially resulting in supporting a greater load. The more handler component assemblies 86 and the greater surface area in contact with sidewall 62 the more load that may be supported by material handler 84. As such, more or fewer handler component assemblies may be provided on sidewall 62. Furthermore, sizes and shapes of T-brace 88 and L-bracket 90 may be altered to provide the necessary surface area between T-brace 88 and L-bracket 90 as well as sidewall 62.

Figure 3A:
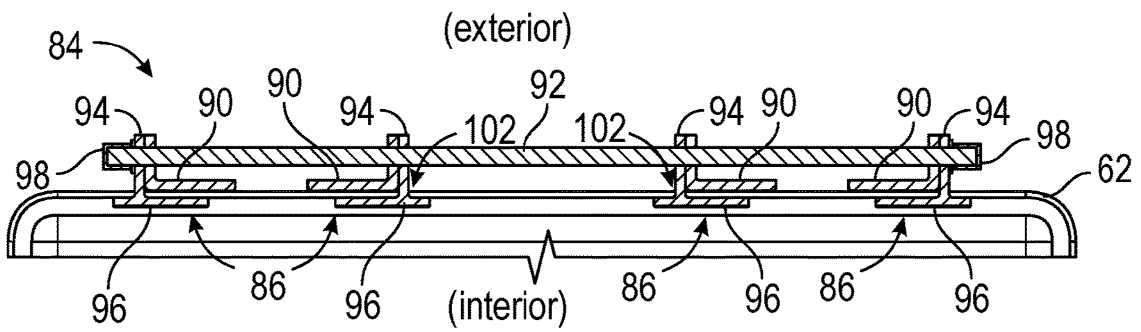
FIGS. 3A-3D depict various views of embodiments of the material handler.
Figure 3B:
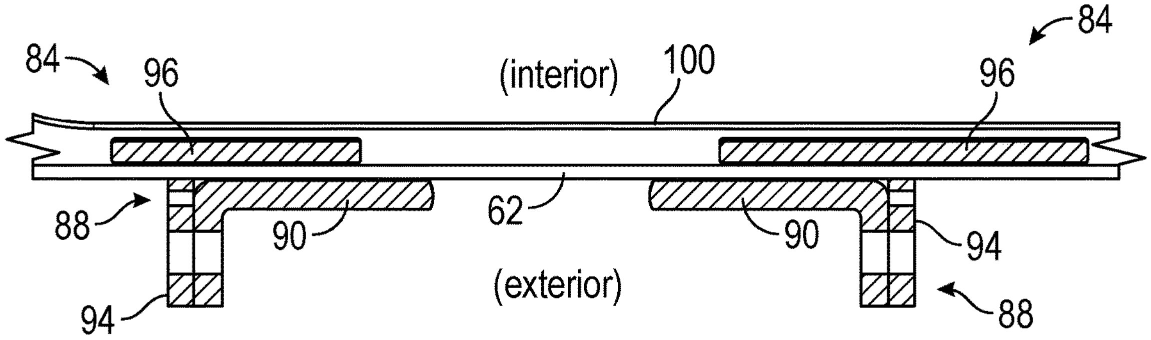

FIGS. 3A-3B illustrate the attachment between components of material handler 84 and sidewall 62 of aerial platform 16. FIG. 3A depicts a top cross-section view of material handler 84 and aerial platform 16 cut through the centerline of crossmember 92, which, in this embodiment, is a cylinder. In some embodiments, slit 102 is provided in sidewall 62 for receiving strut 94 of T-brace 88. Strut 94 of T-brace 88 may slide through slit 102 in sidewall 62 from the interior side of sidewall 62 to the exterior side of sidewall 62 of aerial platform 16. Therefore, plate 96 may be disposed on the interior side contacting interior side of sidewall 62 while strut extends to the exterior side of sidewall 62, as shown in FIGS. 3A and 3B.

In some embodiments, L-bracket 90 may be disposed on the exterior side of sidewall 62 with a sidewall face of L-bracket 90 contacting the exterior side of sidewall 62 and a strut face contacting strut 94. As such, the sidewall face of L-bracket 90 may be fastened to the exterior surface of sidewall 62 and the strut face of L-bracket 90 may be fastened to strut 94 fastening handler component assembly 86 to the exterior side of sidewall 62. Furthermore, plate 96 may be fastened to the interior face of sidewall 62 providing a clamp-like bond of handler component assembly 86 to sidewall 62 of aerial platform 16.

In some embodiments, interior liner 100 may be provided on the interior of aerial platform 16. Interior liner 100 may comprise composite dielectric material providing additional electrical insulation between the workers in aerial platform 16 and the electrically charged phase lines. Interior liner 100 may be provided on the interior side of material handler 84.

Furthermore, as shown in FIG. 3A, each component of handler component assembly 86 may comprise opening 106, or space through which crossmember 92 may be provided. Upon assembly, each opening 106 of T-brace 88 and L-bracket 90 may be aligned such that crossmember 92 may be provided within the space. The shape and function of each opening 106 is described in detail below.

Crossmember 92 may be any shape and length necessary to span any distance between handler component assemblies 86. As shown, crossmember 92 cross-section is circular; however, the cross section of crossmember 92 may be any shape including, for example, square, triangular, rectangular, or any other polygonal or arbitrary shape. As such, crossmember 92 may be manufactured to fit any opening 106 and provide any structural support necessary. Furthermore, in some embodiments, crossmember 92 may comprise composite and dielectric material as discussed in more detail below.

In some embodiments, crossmember 92 may be slid into opening 106 (FIGS. 4A-4D) of handler component assemblies 86. The loads A, B, C may be applied to crossmember 92, and the loads A, B, C may be transferred to aerial platform 16 through handler component assemblies 86 as described above. Crossmember 92 may be secured in handler component assemblies 86 by crossmember fasteners 98 as depicted in FIG. 3A. In some embodiments, crossmember fasteners 98 may be end caps (as shown), pins, cotter pins, clevis pins, hitch pins, safety pins, clamps, and the like. Crossmember fasteners 98 may be positioned at each end of crossmember 92 to secure crossmember 92 in handler component assemblies 86 as shown. In some embodiments, crossmember fasteners 98 may be positioned between handler component assemblies 86 to secure crossmember 92 in handler component assemblies 86 for supporting loads A, B, and C.

FIG. 3B depicts a closer top view of material handler 84 and aerial platform 16. FIG. 3B does not show a cross section view. Therefore, the top end of sidewall 62 is shown. As shown, at least one face of plate 96 is in contact with the interior face of sidewall 62. In some embodiments, a coupling is created between plate 96 and the interior face such that at least a portion of any force applied to strut 94 and L-bracket 90 may be transferred to sidewall 62 across the entire area in contact. In some embodiments, a portion of the force applied to strut 94 and L-bracket 90 may be transferred to sidewall 62 through a coupling of L-bracket 90 to sidewall 62. Therefore, handler component assemblies 86 may be coupled to sidewall 62 at L-bracket 90 (on the exterior face of sidewall 62) and plate 96 (on the interior face of sidewall 62).

In some embodiments, the coupling of L-bracket 90 and plate 96 to sidewall 62 may be created by any fastening mechanism. For example, handler component assembly 86 may be coupled to sidewall 62 by nut and bolt, screws, adhesives, and the like. To generate a bond between the components across the entire contacted surface area an adhesive may be used. Furthermore, the adhesive may be applied between L-bracket 90 and strut 94 to directly bond L-bracket 90 and T-brace 88. In some embodiments, the adhesives may be a double-sided material adhesive, epoxy, glue, pressure sensitive adhesives, cyanoacrylate, ethyl cyanoacrylate, acrylic resin, and polyvinyl acetate. Any adhesive or combination of adhesives may be used to couple handler component assembly 86 to sidewall 62.

Figure 3C:
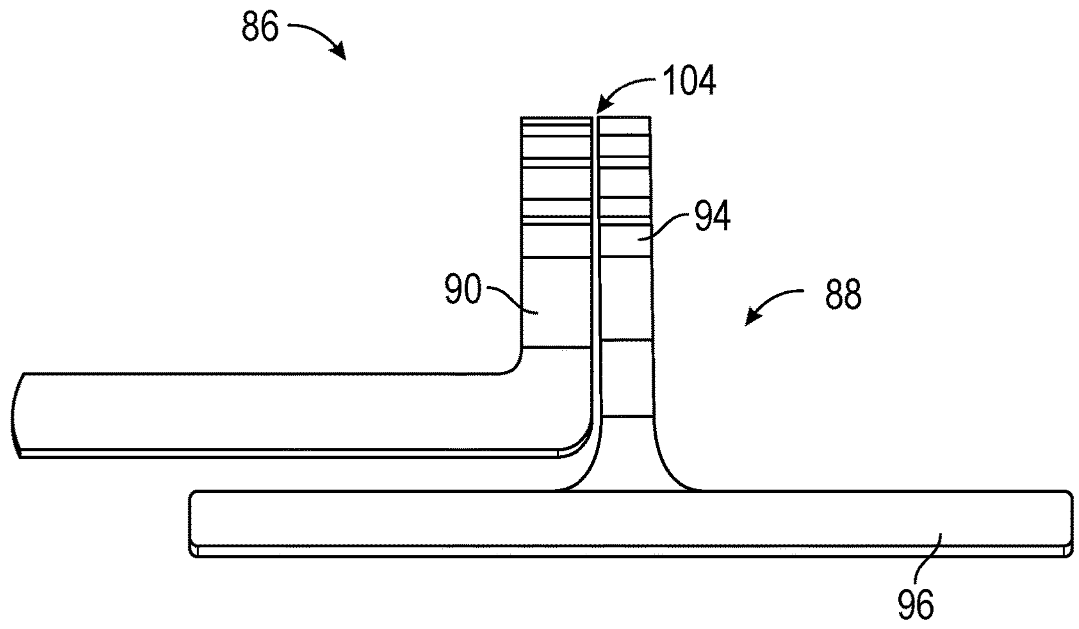

FIG. 3C depicts a top view of material handler 84 with no aerial platform 16 to illustrate some embodiments of the configuration of handler component assembly 86. As described above, L-bracket 90 may be fastened to T-brace 88 by an adhesive at joint 104. Any fastening mechanism described above may be used. For example, any above-described adhesives may be used to bond L-bracket to strut at joint 104.

Figure 3D:
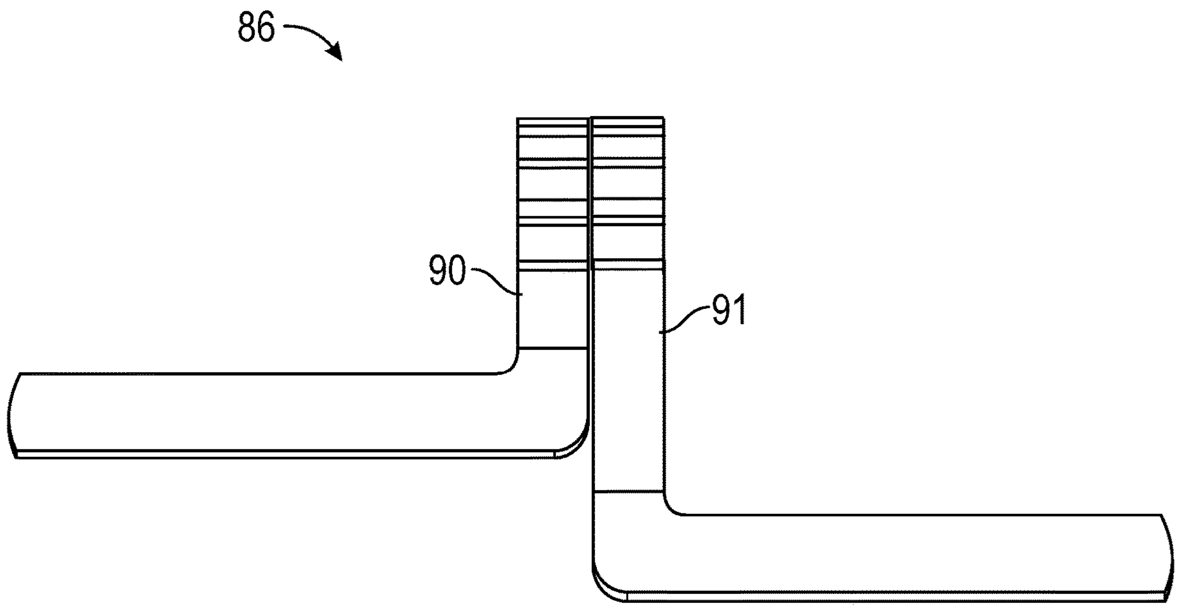

FIG. 3D depicts an embodiment of material handler 84 where L-bracket 90 is a first L-bracket and component assemblies 86 comprise second L-bracket 91 in place of T-brace 88. Here, second L-bracket 91 works similarly to the above-described embodiments of T-brace 88. Second L-bracket 91 may slide through slit 102 and contact L-bracket 90 and the interior of sidewall 62. First L-bracket 90 and second L-bracket 91 may be bonded at joint 104 as described above. Furthermore, second L-bracket and the interior side of sidewall 62 may similarly be bonded using methods described above. As such, any of the above-described embodiments of component assemblies 86 comprising L-bracket 90 and T-brace 88 may similarly, or alternatively, be replaced by first L-bracket 90 and second L-bracket 91.

FIGS. 4A-4D depict embodiments of material handler 84 (without crossmember 92) from various views. In some embodiments, handler component assemblies 86 may comprise various shapes and sizes as material handler 84 may be designed for various loads and fastening methods. Many different types of equipment and tools comprising various weights and sizes may be lifted by material handler 84. As such, material handler 84 may be configured to connect tethers, cables, tie downs, and the like to crossmember 92 and/or hooks 108 to raise loads A, B, and C. Any method of attaching loads to material handler 84 may be used.

Figure 4A:
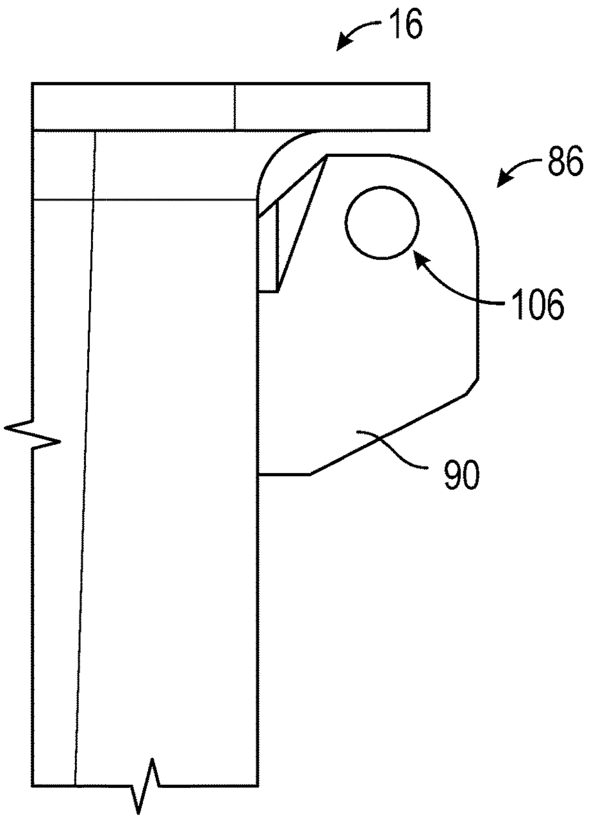
FIGS. 4A-4D depict embodiments of various attachment mechanisms of the material handler.
Figure 4B:
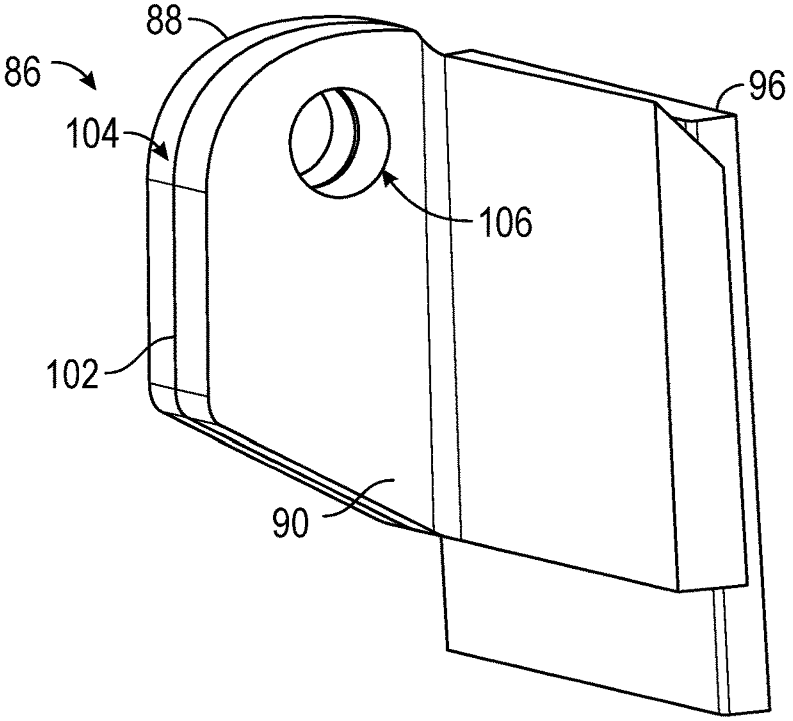

FIGS. 4A-4B depicts an exemplary embodiment of material handler 84 with opening 106 providing space for receiving crossmember 92 and/or attaching loads A, B, and C. FIG. 4A depicts a side view of handler component assembly 86 illustrating T-brace 88 mounted on aerial platform 16. Though not shown, it can be imagined that L-bracket 90 is attached to T-brace 88 and sidewall 62 of aerial platform 16 as shown in FIG. 4B. Opening 106 here, comprises a circular shape. The circular shape is exemplary and may correspond to the cross section of crossmember 92. As such, crossmember 92 may slide through space in L-bracket 90 and T-brace 88. As described above, crossmember 92 may be secured in opening 106 using crossmember fasteners 98 described above. Once secure, crossmember 92 may support loads A, B, and C transferring load to aerial platform 16 through handler component assemblies 86.

FIG. 4B depicts the exemplary embodiment of material handler 84 from FIG. 4A from a perspective view showing T-brace 88 and L-bracket 90 along with joint 104. Here, sidewall 62 is not shown illustrating the arrangement of components of T-brace 88 and L-bracket 90. Here, T-brace 88 and L-bracket 90 are arranged such that opening 106 is aligned when T-brace 88 and L-bracket 90 are coupled at joint 104. This allows crossmember 92 to be disposed withing opening 106 such that loads A, B, and C are distributed to both T-brace 88 and L-bracket 90 transferring the loads through the surface area of L-bracket 90 and T-brace 88 on sidewall 62.

Figure 4C:
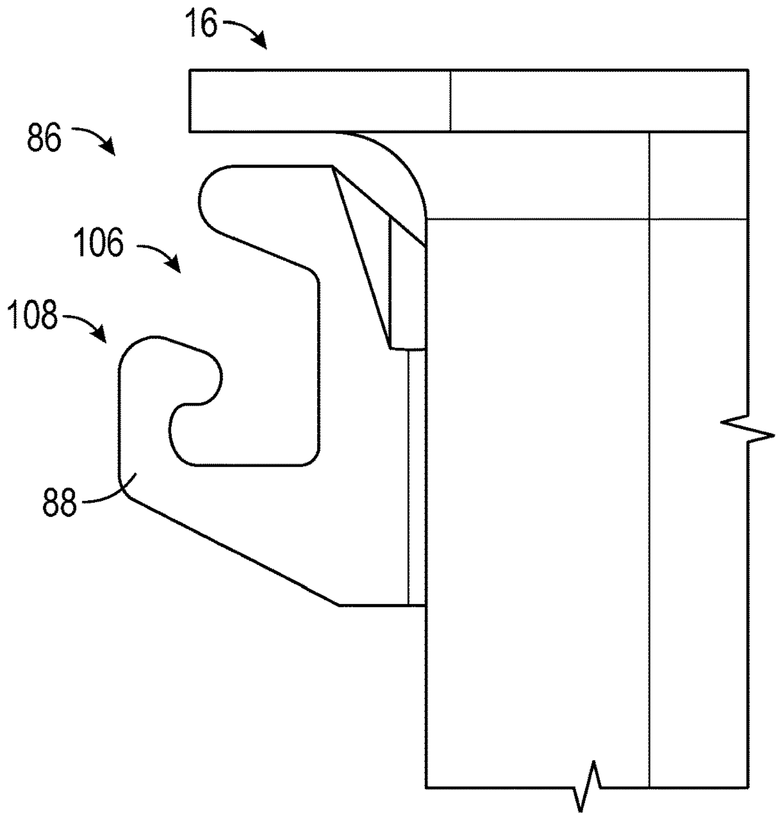
Figure 4D:
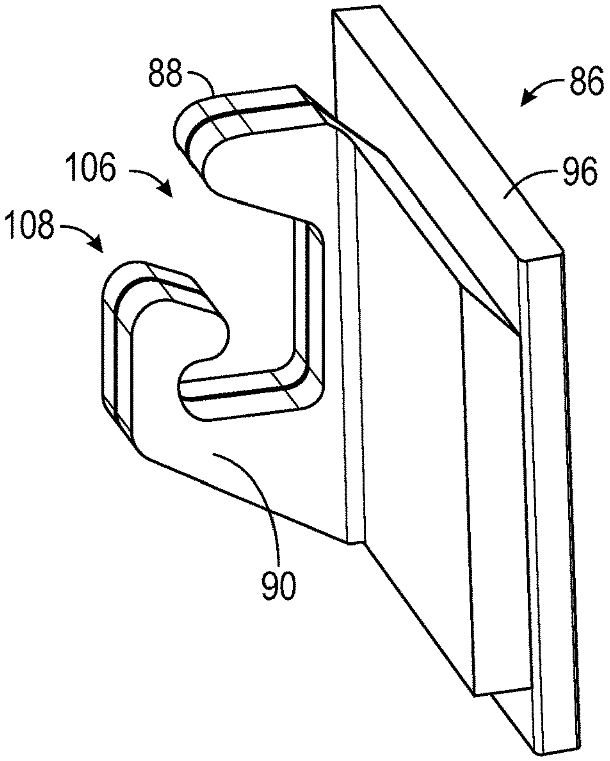

FIGS. 4C-4D depicts an exemplary embodiment of material handler 84 with a hook-shaped space for supporting crossmember 92, ropes, cables, tie-downs, and the like. Here, handler component assembly 86 may be similarly attached to sidewall 62 of aerial platform 16 and only opening 106 may be designed differently. As shown, opening 106 may comprise hook 108 such that loads A, B, and C may be attached to individual handler component assemblies 86. When the circular shape is used from embodiments described above, crossmember 92 may be used to support loads A, B, and C, unless the load comprises an attachment such as, for example, a clamp, carabiner, hook, hook and loop, or the like. The embodiment displayed in FIGS. 4C-4D, hook 108 is provided by handler component assembly 86. It should be noted that opening 106 may not only comprise a circular space and a, but may comprise any shape including square, rectangular, oval, any polygon, and/or abstract shape for connecting loads A, B, and C.

In some embodiments, material handler 84 may comprise composite material. T-brace 88, L-bracket 90, and crossmember 92 may be composed entirely of composite material such as, for example, reinforced or unreinforced thermoplastics or thermosets, laminar composites, fiber-reinforced composites, particulate composites, and any combination thereof. In some embodiments, fiber reinforced composites may be used to provide the structural deflection strength to support loads A, B, and C; however, any composite structures that comprise dielectric properties may be used.

In some embodiments, material handler 84 may comprise dielectric material. The composite materials described above may also be dielectric. The dielectric properties may provide an additional layer of electrical insulation between aerial platform 16 and any component that may come into contact with obstacles 56, which may be electrically charged.

Figure 5:
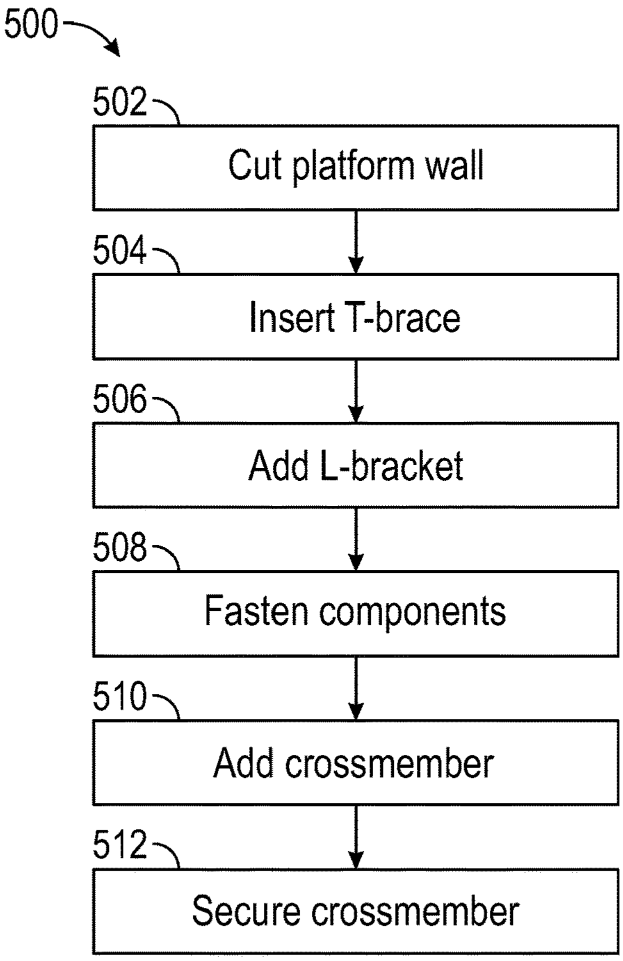
FIG. 5 depicts a flow chart illustrating a process of assembling the material handler with the aerial platform.

FIG. 5 depicts a flow chart 500 illustrating a process of assembling material handler 84 with aerial platform 16. At step 502, sidewall 62 of aerial platform 16 may be prepared for receiving material handler 84. In some embodiments, slit 102 may be cut into sidewall 62 to dimensions of strut 94. As such, slit 102 may be configured to receive strut 94. Furthermore, any surface of sidewall 62, T-brace 88, and/or L-bracket 90 may be conditioned to receive adhesive by preparing a rough surface of the composite material making up material handler 84.

At step 504, strut 94 of T-brace 88 may be inserted through slit 102 of sidewall 62 from the interior side to the exterior side of sidewall 62. This action leaves plate 96 on the interior side with strut 94 extending through sidewall 62 to the exterior side of aerial platform 16. At this point, adhesive may be applied to sidewall 62 and plate 96 where sidewall 62 and plate 96 are in contact. The adhesive may bond, or couple, sidewall 62 to plate 96.

At step 506, L-bracket 90 may be provided on the exterior side of sidewall 62. L-bracket 90 may be placed in contact with strut 94 and the exterior side of sidewall 62. Furthermore, opening 106 of L-bracket 90 and strut 94 may be shaped similarly and aligned providing a space for receiving crossmember 92 and/or receiving loads A, B, and C. Adhesive may be applied to L-bracket 90, strut 94, and T-brace 88 where contact is made.

At step 508, handler component assembly 86 may be attached to sidewall 62. As described above, T-brace 88 may be attached to the interior side of sidewall 62 and L-bracket 90 may be attached to the exterior side of sidewall 62 by adhesive. As such, any load applied to L-bracket 90 may be transferred through the surface area in contact between L-bracket 90 and the exterior of sidewall 62. Furthermore, the load may be received by opening 106 in strut 94 of T-brace 88 transferring the load to the interior of sidewall 62 by plate 96.

At optional step 510, crossmember 92 may be added. Crossmember 92 may be provided through opening 106, which may be any shape as described above. Crossmember may be added through space and crossmember fasteners may be added at step 512 at any point along crossmember 92 to secure crossmember 92 in place relative to handler component assembly 86. As such, material handler 84 may be attached to aerial platform 16 and configured to support loads A, B, C on platform sidewall 62 while the loads A, B, C are elevated for work on elevated power lines.

Figure 6:
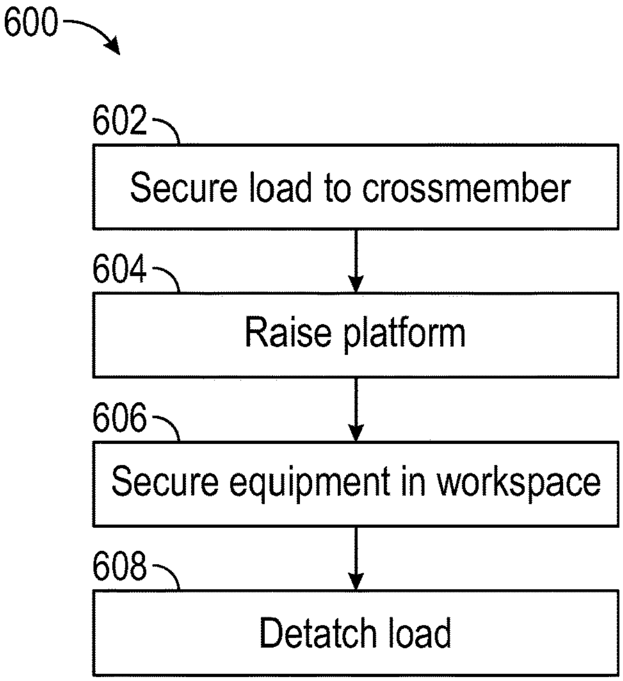
FIG. 6 depicts an exemplary flow chart illustrating a method of supporting a load by the material handler.

FIG. 6 depicts a flow chart 600 illustrating a process of supporting loads with material handler 84. At step 602, loads A, B, C may be applied to material handler 84. Loads A, B, C may be secured to material handler 84 by attaching a fastener to crossmember 92 or directly in opening 106 on handler component assembly 86 as described above. The fasteners may be intermediate attachments such as carabiners, hooks, tethers, and the like. The loads may be any tools or equipment that may be necessary to perform the aerial work described above. For example, loads A, B, C may be phase lines, insulators, transformers, jibs, hydraulic tools, hand tools, self-powered tools, and the like. Loads A, B, C may be any object that may be useful for performing the aerial work.

At step 604, aerial platform 16 may be raised to the elevated working environment. A boom operator situated on the ground, at base 12, or in aerial platform 16 may operate boom assembly 14 to raise aerial platform 16 and loads A, B, C. In some embodiments, aerial platform 16 may be programed to rise automatically. As aerial platform 16 is raised, loads A, B, C may be supported by material handler 84 as described above.

At step 606, when aerial platform 16 reaches the working environment, the raised equipment may be secured in aerial platform 16 and/or in the working environment. For example, the equipment may be tools and a transformer. When the transformer is secured to the power pole, the transformer may be detached from material handler 84, at step 608. As such, loads A, B, C may be released from material handler 84 when secured in the working environment. When the transformer is attached and aerial platform 16 is clear of any obstacles 56, aerial platform 16 may be lowered back to base 12.

Although the present disclosure has been described with reference to the embodiments illustrated in the attached drawing figures, it is noted that equivalents may be employed, and substitutions made herein without departing from the scope of the present disclosure as recited in the claims.

Having thus described various embodiments of the present disclosure, what is claimed as new and desired to be protected by Letters Patent includes the following:

1. A material handler for supporting a load on an aerial platform, the material handler comprising:

a T-brace comprising:

a strut configured to be inserted through a sidewall of the aerial platform spanning between an interior of the aerial platform and an exterior of the aerial platform, wherein the strut comprises a strut opening presenting a hook shape, the hook shape comprising a hook opening configured to receive and support a crossmember therein; and a plate configured to be in contact with an interior side of the sidewall of the aerial platform;

an L-bracket configured to be placed in contact with the strut and an exterior side of the sidewall of the aerial platform; and an L-bracket opening formed in the L-bracket and presenting the hook shape configured to receive and support the crossmember;

wherein the L-bracket and the T-brace are configured to support the load via the crossmember providing at least a portion of the load to a portion of the sidewall of the aerial platform in contact with the plate.

2. The material handler of claim 1, wherein the L-bracket is coupled to the strut and the exterior side of the sidewall by an adhesive, and wherein the plate is coupled to the interior side of the sidewall by the adhesive.

3. The material handler of claim 1, wherein the crossmember comprises a composite dielectric material supporting the load and insulating the aerial platform from electric energy.

4. The material handler of claim 3, wherein the composite dielectric material comprises reinforced or unreinforced thermoplastics or thermosets.

5. The material handler of claim 1, wherein the T-brace is a first T-brace and the strut opening is a first strut opening, wherein the L-bracket is a first L-bracket and the L-bracket opening is a first L-bracket opening, and wherein the material handler further comprises:

a second T-brace disposed on the sidewall of the aerial platform and comprising a second strut opening presenting the hook shape;

a second L-bracket disposed on the sidewall of the aerial platform and comprising a second L-bracket opening presenting the hook shape;

wherein the crossmember is disposed in the first strut opening, the first L-bracket opening, the second strut opening, and the second L-bracket opening and the crossmember is configured to support the load between the first T-brace, the first L-bracket, and the second T-brace, and the second L-bracket.

6. The material handler of claim 5, wherein the material handler further comprises crossmember fasteners securing the crossmember in at least the first strut opening and the second strut opening.

7. A material handler for supporting a load on an aerial platform, the material handler comprising:

a crossmember configured to support the load;

a T-brace comprising:

a strut configured to be inserted through a sidewall of the aerial platform spanning between an interior of the aerial platform and an exterior of the aerial platform, wherein the strut comprises a strut opening presenting a hook shape, the hook shape comprising a hook opening configured to receive and support the crossmember therein; and a plate configured to be in contact with an interior side of the sidewall of the aerial platform;

an L-bracket configured to be placed in contact with the strut and an exterior side of the sidewall of the aerial platform, wherein the L-bracket comprises an L-bracket opening presenting the hook shape configured to receive and support the crossmember; and crossmember fasteners configured to secure the crossmember in the strut opening and the L-bracket opening.

8. The material handler of claim 7, wherein the T-brace and the L-bracket comprise dielectric material configured to support the load and insulate the aerial platform from electric energy.

9. The material handler of claim 8, wherein the T-brace and the L-bracket are connected by an adhesive.

10. The material handler of claim 9, wherein the T-brace is coupled to the interior side of the sidewall by the adhesive and the L-bracket is coupled to the exterior side of the sidewall by the adhesive.

11. The material handler of claim 7, wherein the crossmember fasteners comprise a first end cap disposed on a first end of the crossmember and a second end cap disposed on a second end of the crossmember.

12. The material handler of claim 11, further comprising:

a plurality of L-brackets and a plurality of T-braces providing a plurality of openings presenting the hook shape, wherein the plurality of L-brackets and the plurality of T-braces are coupled to the sidewall and are configured to receive and support the crossmember in the plurality of openings.

13. The material handler of claim 12, wherein the crossmember fasteners are end caps disposed on each end of the crossmember.

14. A material handler for supporting a load on an aerial platform, the material handler comprising:

a crossmember configured to support the load;

a plurality of T-braces, each T-brace comprising:

a strut configured to be inserted through a sidewall of the aerial platform from an interior of the aerial platform to an exterior of the aerial platform;

a strut opening presenting a hook shape, the hook shape comprising a hook opening configured to receive and support the crossmember therein; and a plate configured to be in contact with an interior side of the sidewall of the aerial platform; and a plurality of L-brackets, each L-bracket of the plurality of L-brackets configured to be placed in contact with a corresponding strut and an exterior side of the sidewall of the aerial platform, each L-bracket including an L-bracket opening presenting the hook shape configured to receive and support the crossmember.

15. The material handler of claim 14, wherein the plurality of T-braces, the plurality of L-brackets, and the crossmember comprise dielectric materials configured to insulate the aerial platform from electric energy.

16. The material handler of claim 15, wherein the plurality of T-braces, the plurality of L-brackets, and the crossmember comprise composite material configured to support the load.

17. The material handler of claim 16, further comprising:

a first end cap disposed on a first end of the crossmember, and a second end cap disposed on a second end of the crossmember, wherein the first end cap and the second end cap are configured to secure the crossmember in each strut opening and each L-bracket opening.

18. The material handler of claim 17, wherein the plurality of L-brackets is coupled to the exterior side of the sidewall, and the plurality of T-braces is coupled to the interior side of the sidewall.

19. The material handler of claim 18, wherein the plurality of L-brackets and the plurality of T-braces are coupled to the sidewall by an adhesive.

* * * * *